Figure 1:
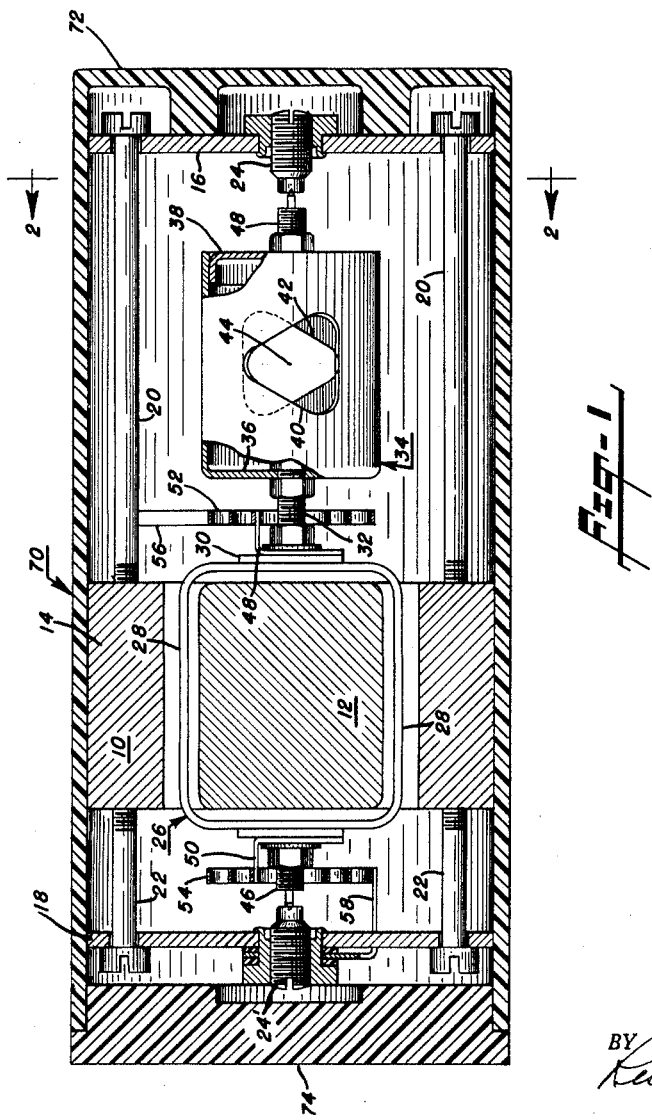

June 16, 1964      F. X. LAMB      3,137,223
APERTURE CONTROL MECHANISMS FOR PHOTOGRAPHIC APPARATUS
Filed March 24, 1961      2 Sheets-Sheet 1

FRANCIS X. LAMB
INVENTOR.

BY
ATTORNEY

June 16, 1964  F. X. LAMB  3,137,223
APERTURE CONTROL MECHANISMS FOR PHOTOGRAPHIC APPARATUS
Filed March 24, 1961  2 Sheets-Sheet 2

FRANCIS X. LAMB
INVENTOR.

BY Rudolph E. Smick
ATTORNEY

United States Patent Office 3,137,223
Patented June 16, 1964

---

3,137,223
APERTURE CONTROL MECHANISMS FOR PHOTOGRAPHIC APPARATUS
Francis X. Lamb, East Orange, N.J., assignor, by mesne assignments, to Daystrom, Incorporated, Murray Hill, N.J., a corporation of Texas
Filed Mar. 24, 1961, Ser. No. 98,110
1 Claim. (Cl. 95—64)

This invention relates to an automatic diaphragm control arrangement for cameras and the like, as for control of camera lens aperture in response to the intensity of ambient light and, more particularly, to a combination meter mechanism and diaphragm for use in such an automatic diaphragm control arrangement.

Automatic diaphragm control arrangements are adapted for use in both motion and still picture cameras to automatically adjust the lens aperture thereof with changes in brightness of the scene being photographed. With motion picture cameras, differences in the scene brightness may result from momentary clouding over of the sun, movement of the subject into areas having differing backgrounds, panning of the camera, by the operator, to secure a panoramic effect or the like and if the lens aperture is not adjusted for the varying light conditions, portions of the film are certain to be over or underexposed with a resultant loss in photographic continuity. Obviously, continuity is also lost if the operator must stop to make frequent lens aperture adjustments under changing lighting conditions. An effective solution to this problem of changing light conditions is an arrangement for automatically varying the camera lens aperture in accordance with the scene brightness.

In general, automatic lens aperture control arrangements include a photoelectric cell which is responsive to the intensity of light from the scene or subject being filmed. The photocell output is fed to an electrical meter mechanism which, in turn, actuates a diaphragm mechanism for control of the lens aperture in accordance with the intensity of light striking the photocell. I provide a novel electrical instrument and diaphragm construction for use in such automatic lens aperture control arrangements which construction is extremely light weight, compact, and inexpensive. The construction is readily adapted for use in conversion of manually adjustable diaphragm arrangements to automatic control arrangements with only minor modification of the camera lens tube, or the like.

Any suitable meter mechanism, preferably of the permanent magnet moving coil type, may be used in the arrangement of my invention. A cylinder with a pair of diametrically disposed teardrop-shaped apertures formed therein is directly secured to the movable coil of the instrument mechanism for drive rotation thereof in accordance with the energization of the instrument. The cylinder, with the shaped apertures therein, comprises the diaphragm mechanism which controls the lens aperture.

An object of this invention is the provision of an extremely low friction, lightweight and compact movable coil instrument mechanism and attached cylindrical-shaped light gate for use in automatic lens aperture control arrangements for cameras, and the like.

An object of this invention is the provision of an electrical instrument mechanism and diaphragm arrangement comprising a unit which is detachably securable to a camera for ease in manufacturing, adjustment, servicing, and shipping thereof.

An object of this invention is the provision of a movable coil electrical instrument having a diaphragm comprising a tubular member with diametrically spaced teardrop-shaped apertures therein attached to the movable coil for rotation therewith, the amount of light passing through the apertures depending upon the relative rotary position of the said tubular diaphragm.

These and other objects and advantages of the invention will become apparent from the following description when taken with the accompanying drawings. It will be understood that the drawings are for purposes of illustration and are not to be construed as defining the scope or limits of the invention, reference being had for the latter purpose to the appended claims.

Figure 2:
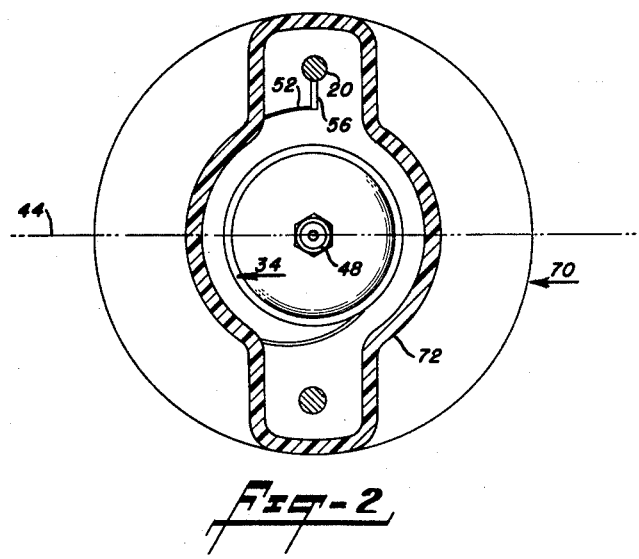
Figure 3:
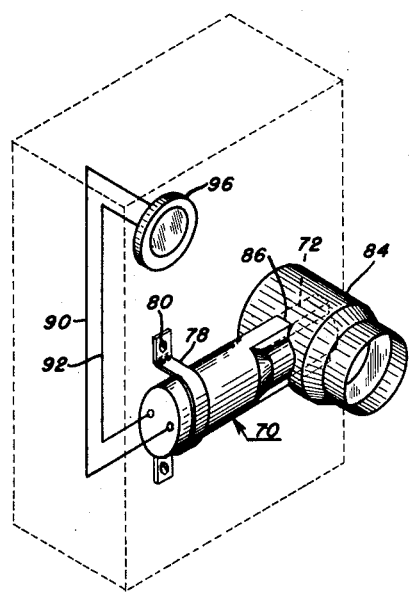

In the drawings wherein like reference characters denote like parts in the several views:
FIGURE 1 is a longitudinal sectional view of an instrument-actuated diaphragm arrangement embodying my invention;
FIGURE 2 is a sectional view taken on line 2—2 of FIGURE 1; and
FIGURE 3 is a perspective view showing the mechanism attached to a camera.

Referring to FIGURES 1 and 2 of the drawings, there is shown an electrical instrument mechanism 10 of the permanent core magnet moving coil type comprising a core magnet 12 surrounded by a soft-iron yoke 14. Bridge members 16 and 18 are secured by bolts 20 and 22, respectively, to the ends of the generally cylindrical-shaped yoke 14, which bridges carry jewel bearing assemblies 24, 24'. A wire wound movable coil 26 surrounds the magnet 12 with the sides 28, 28 of the coil extending through annular flux gaps formed between the magnet and yoke.

A base member 30 having a post 32 thereon is secured to one end of the coil, and carries an opaque cylinder 34 comprising an adjustable light gate or diaphragm. The cylinder 34 comprises a tubular member which may be closed at the ends by end members 36 and 38, with the end member 36 secured to the post 32 axially therewith. Means forming teardrop-shaped apertures (which may be of identical shape but which are provided with separate reference characters 40 and 42) are formed in diametrically opposed cylinder walls through which light may pass. The apertures are located along the lens or optical axis 44 of the photographic apparatus with which the arrangement is associated.

A first pivot pin 46 is secured to the other end of the coil 26 while a second pivot pin 48 is secured to the cylinder end wall 38 which pivot pins are seated in the jewel bearings 24' and 24 for the pivotable support of the coil and attached cylinder 34 along a common pivot axis. Spring abutments 48 and 50 are suitably secured to the coil 26 and are connected to one end of spiral springs 52 and 54, respectively. The outer end of the spiral spring 52 is connected through an abutment 56 to the bolt 20, while the outer end of the spiral spring 54 is connected to the bridge member 18 by means of spring abutment 58. Current from the photoelectric cell, not shown in FIGURES 1 and 2, is connected to the movable coil 26 through the spiral springs in a manner well known to those skilled in this art. Such springs also serve to return the instrument coil 26 and cylinder 34 to a normal zero position when the coil is unenergized, as is understood.

It will be understood that a lens aperture is provided by the teardrop-shaped slots 40 and 42 in the cylinder 34 along the lens, or optical axis 44 of the photographic apparatus, the effective size of which lens aperture depends upon the energization of the coil 26 which, in turn, depends upon the light striking a photocell having an output connected to the said coil. The cylinder 34 may be positioned behind camera lenses and in front of a photographic film, while means forming a suitable exposure aperture in alignment with the lens or optical axis and a shutter actuated in timed relation with the intermittent feed of the photographic film are included in a camera construction in the usual manner as will be understood by those skilled in this art. The diaphragm opening at the lens axis is variable with rotation of the cylinder 34, with the cylinder being shown positioned to provide a maximum diaphragm opening. The cylinder 34 is preferably provided with the smallest possible diameter permitted by the aperture shape and size to reduce vignette to a minimum.

In operation, under minimum, or zero light conditions, the instrument coil is in its normal zero position, as illustrated, wherein the cylinder apertures provide a maximum diaphragm opening. As the light intensity impinging on the photocell connected to the instrument increases, the instrument is energized and the movable coil deflected from its normal zero position to thereby decrease the diaphragm opening. As viewed in FIGURE 2, the instrument coil and attached cylinder 34 rotate in a counter-clockwise direction about the pivot axis thereof with increased energization of the said coil to decrease the aperture opening.

The entire instrument and diaphragm arrangement described above may be housed in a generally cylindrical-shaped housing 70 having an elongated end 72 of reduced size and of transparent material within which the cylindrical diaphragm 34 operates. Suitable means, not shown, may be included to fasten the instrument therewithin. A rear cover 74 substantially seals the mechanism within the casing. The unitary assembly, as described above, is easily adapted for use on a camera. As seen in FIGURE 3, the device may be attached by a strap 78 of fastening means 80 to the front of a camera case 82, indicated in broken lines. The illustrated camera includes a lens tube 84 having an opening 86 formed in the side thereof into which the end 72 of the device extends. The instrument is connected through lead wires 90 and 92 to a photoelectric cell 96 for automatic control of the camera lens aperture.

Having now described my invention in detail, in accordance with the requirements of the Patent Statutes, various changes and modifications will suggest themselves to those skilled in this art, and it is intended that such changes and modifications shall fall within the spirit and scope of the invention as recited in the following claim.

I claim:

In automatic diaphragm arrangement, an electrical instrument comprising a permanent magnet, a soft iron yoke surrounding the magnet and forming a pair of annular flux gaps therewith, a coil having opposite sides in the annular flux gaps, a tubular member secured to the coil axially therewith, means forming a pair of generally teardrop-shaped holes in the tubular member at diametrically opposed walls thereon, a pair of bridge members secured to the yoke, a pair of bearing assemblies carried by the bridge members, pivot pins secured to the coil and tubular member and rotatably supported in the bearing members, the holes in the tubular member providing an aperture of variable size upon rotation thereof.

References Cited in the file of this patent
UNITED STATES PATENTS
683,573 Pasquarelli _____ Oct. 1, 1901
FOREIGN PATENTS
1,222,740 France _____ Jan. 25, 1960